Patented June 29, 1926.

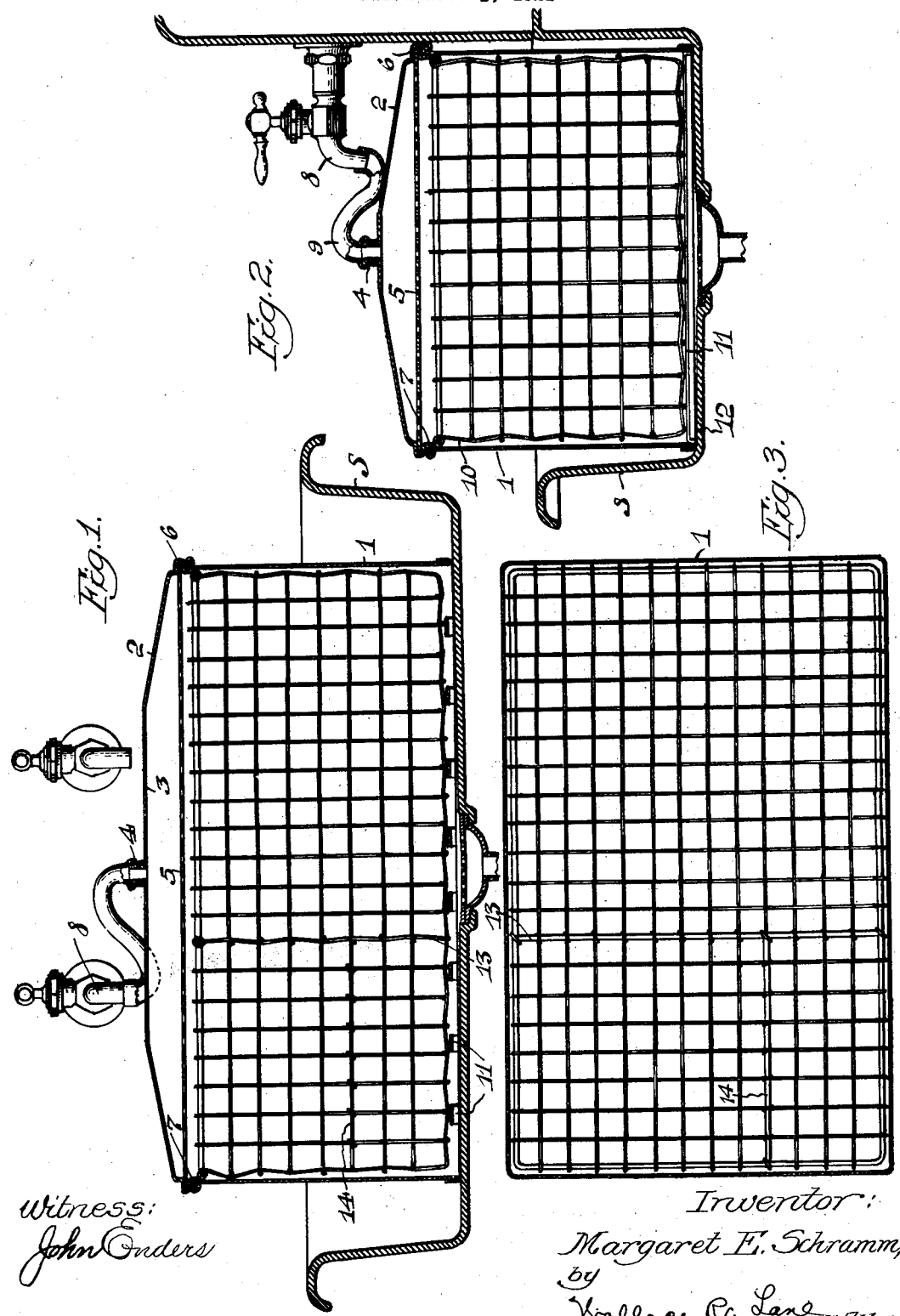

1,590,914

UNITED STATES PATENT OFFICE.

MARGARET E. SCHRAMM, OF CHICAGO, ILLINOIS.

DISHWASHER.

Application filed November 1, 1921. Serial No. 512,108.

My invention relates more particularly to portable dish washers adapted to be placed in a receptacle such as a sink or large pan and to receive therein the dishes to be washed and among the objects of my invention are to provide an improved construction for the spraying of water upon the dishes which are placed in the dish-washer; to provide a new means for holding the dishes in position in the washer; to provide new means for supporting the dish basket out of contact with the bottom of the container in which the washer is placed; to improve in general upon the construction of this type of dish-washers; and such further objects, advantages and capabilities as will later more fully appear.

My invention further resides in the combination, construction and arrangement of parts illustrated in the accompanying drawing, and, while I have shown therein a specific embodiment of my invention, I desire the same to be understood as illustrative only and not as limiting the invention.

In the drawings, Fig. 1 is a central vertical longitudinal sectional view of the device.

Fig. 2 is a central vertical sectional view at right angles to Fig. 1.

Fig. 3 is a horizontal sectional view illustrating the relation of the container and basket.

Referring more in detail to the drawing annexed hereto and forming a part hereof, letter S denotes the container, such as a pan or sink, in which the dish-washer is placed when the dishes are to be washed. Numeral 1 designates the wall of the dish-washer which is in the nature of a bottomless container. 2 designates the cover of this container, which cover comprises an upper portion 3, perforated and provided with a nipple as shown at 4, and a perforated bottom portion 5, which has its edges tightly held in a groove as shown at 6, formed by bending over the outer edge of the upper portion 3 and compressing the same tightly upon the edge of the lower portion 5. The extreme edge of this upper portion is bent downwardly to form a flange 7 which fits closely within the upper edge of the body 1. Connecting the nipple 4 with a faucet 8 is a flexible tubing 9, preferably a piece of rubber tubing.

Placed within the body wall 1 of the dishwasher is a basket 10, which is preferably formed from a coarse mesh netting made of heavy grade wire. This basket 10 rests on a series of cross bars 11 having their ends bent downwardly as shown at 12 and secured to the lower portion of the wall 1. This raises the main portion of these cross members 11 sufficiently above the container bottom so that the dishes will not stand in the water which is used to wash them. Cross walls 13 and 14 are used to divide the container up into smaller compartments and assist in holding dishes of different sizes in such position as to be most effectively washed.

It will be understood from the foregoing description that when the dishes are inserted in the wire basket and stood up in position as is well understood in this art, and the water is admitted through faucet 8 to the compartment in the cover 2, the water will spread out over the perforated bottom 5 and will be sprayed over all the dishes in the basket, thereby very effectively washing the same.

It is of course understood that the specific description of structure set forth above may be departed from without departing from the spirit of my invention as set forth in this specification and the appended claims.

Having now described my invention, I claim:—

1. A portable dishwasher adapted to be placed in a sink comprising a container having an open bottom, a perforated cover, and a plurality of girders attached to the lower portion of a side wall of said container and a draining basket resting on said girders in a position above the used dishwasher water.

2. A portable dishwasher comprising a container adapted to be removably used in a sink having a flexible tubing to connect with a faucet for introducing water into the dishwasher, said container having a perforated cover, a perforated plate, and an open bottom portion, a draining basket, and a plurality of girders secured in said container for holding said draining basket out of contact with used dish water.

In witness whereof, I hereunto subscribe my name to this specification.

MARGARET E. SCHRAMM.